United States Patent Office 2,953,682
Patented Sept. 20, 1960

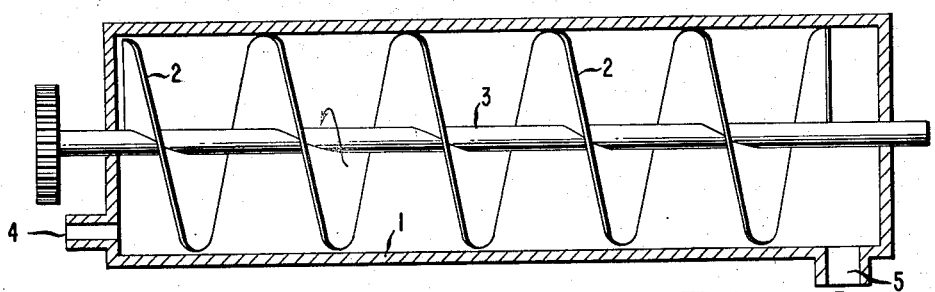
Fig. 1
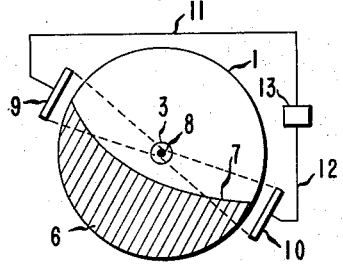
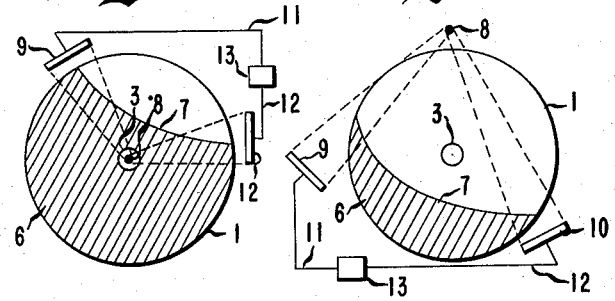
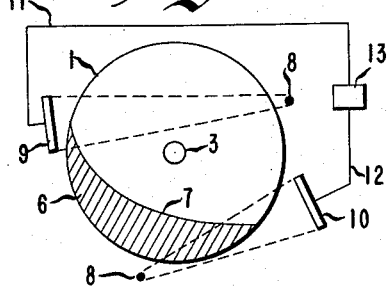
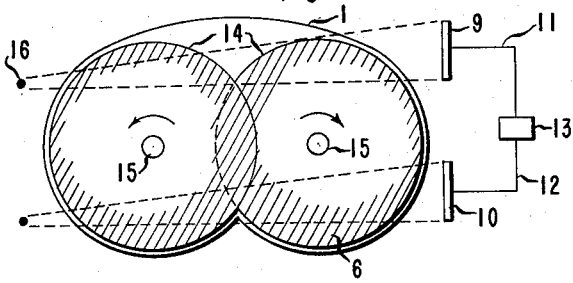
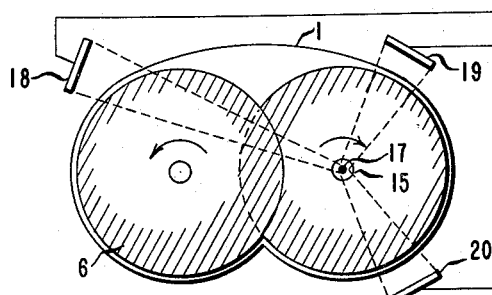
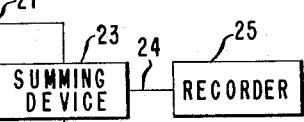
INVENTORS
GEORGE EDMONT FRANK
SCHUBERT GERNT MEASAMER
BY John Ellsworth Griffiths
ATTORNEY

2,953,682
LIQUID MASS AND VISCOSITY DETERMINATION

George Edmond Frank and Schubert Gernt Measamer, Circleville, Ohio, assignors to E. I. du Pont de Nemours and Company, Wilmington, Del., a corporation of Delaware Filed Nov. 29, 1956, Ser. No. 625,180

4 Claims. (Cl. 250—43.5)

This invention relates to a process and apparatus for determining variations of viscosity of a liquid independent of variations in mass and for determining variations of mass of a liquid independent of variations of viscosity.

In a closed vessel in a continuous polymerization process, such as in the production of high molecular weight polyesters and polyamides knowledge and control of the viscosity and mass of the polymer in the vessel is of major importance in attaining constant and uniform high quality in the finished product.

It is therefore an object of the present invention to provide an improved process and apparatus for determining variations in viscosity and mass of a liquid. Another object is to provide for such determination where the liquid is in a closed vessel. Still other objects will be apparent from the following description of the invention.

In a broad aspect, the process of this invention comprises stirring a partially confined liquid about an axis to produce relative vertical displacement of portions of the liquid with respect to the surface level of the liquid in unstirred condition, thus effecting a first portion of the liquid above and a second portion of the liquid below said surface level, directing radiation of which the liquid is partially absorptive transversely in at least one beam at least partly through said first portion of the liquid while directing radiation of which the liquid is partially absorptive in at least one beam at least partly through said second portion of the liquid, measuring said radiation after interception by said first portion and said second portion, and summing the measurements. The measurements are preferably indicated by electrical signals of preselectable polarity.

In another aspect, the invention is directed to the process of providing continuous indication, with respect to a liquid partially filling a vessel, of variations in viscosity independent of variations in mass, or variations in mass independent of variations in viscosity, said process comprising uniformly stirring said liquid about a substantially horizontal axis to effect a high and low relative vertical displacement of portions of the liquid, directing first radiation comprising at least one beam, said first radiation being partially absorbable by said liquid and directed to pass at least in part through the vertically displaced high portion of the liquid, directing second radiation comprising at least one beam, said second radiation being partially absorbable by said liquid and directed to pass at least in part through the vertically displaced low portion of the liquid, measuring said first and second radiations after passing at least in part through said liquid, and summing the measurements. The radiations are preferably from a single source and the summing is preferably indicated by a visual record, e.g., a chart or graph.

The process of this invention will be further explained and illustrations of novel apparatus for carrying out said process will be described with reference to the accompanying drawing wherein—

Fig. 1 is a schematic longitudinal elevation partly in section of a vessel suited for use according to the present invention;

Fig. 2 represents a transverse section through the apparatus of Fig. 1, with indication of elements employed according to this invention;

Fig. 3, Fig. 4 and Fig. 5 each represent a modification of the apparatus of Fig. 2 employed according to this invention;

Fig. 6 represents a transverse section through twin screw apparatus and vessel for use according to the present invention; and Fig. 7 represents a modification of the apparatus of Fig. 6 illustrating a preferred arrangement.

Referring now to the drawing, wherein like numbers indicate like parts in the several figures, the apparatus shown in Fig. 1 includes a vessel 1 or container for liquid, a stirring and forwarding rotor 2 suitably mounted and driven by shaft 3. Inlet 4 and outlet 5 for the liquid are conveniently provided for use during a continuous process.

Fig. 2 shows the location of additional elements utilized in the practice of this invention relative to a schematic transverse section of the apparatus just described; the vessel 1 appears partly filled with liquid material 6 whose surface 7 is displaced vertically from its normal undisturbed gravitational at-rest surface level by rotation of the rotor 2. Radiation source 8 is conveniently located in a hollow inside shaft 3 and the effect of being directed in two beams, one to each of radiation detectors 9 and 10 is obtained. The beams are so directed by the positioning of the detectors that one of the beams between the source and detector 9 is intercepted by the higher portion of the unevenly distributed liquid, i.e., the beam passes at least partially through the vessel contents above the average surface level of the liquid, while the other beam between the source and detector 10 is intercepted by the lower portion of the unevenly distributed liquid, i.e., the beam passes at least partially through the vessel contents below the average surface level of the liquid. The radiation is of such character that it will be absorbed in part by the liquid, but part of the radiation will be transmitted through the liquid; the greater the amount of the liquid which is positioned between the source and a detector, the weaker will be the intensity of the radiation detected by the detector.

Operation of this apparatus is readily understood. With constant rotation of the rotor, the liquid in the vessel will be elevated at one side and depressed at the other side. The elevation of any one portion of the liquid will depend in part on the amount of liquid in the vessel. Thus, referring to Fig. 2, if only a little liquid is in the vessel, there will be very little interference to deter the passage of radiation to both detectors. If, on the other hand, the vessel is more full, more liquid intercepts both beams of radiation, and each detector evidences a diminution in reception of radiation. It can thus be seen that the reception by each detector is influenced appreciably by variations of the mass of the liquid in the vessel.

It will also be apparent that the viscosity of the liquid will largely determine the relative vertical displacement between the high and the low portions of the stirred liquid. Assuming constant rotation of the stirring or agitating means, the more viscous the liquid, the greater the difference between the two height extremes, i.e., under constant stirring conditions, the rotor will urge the higher liquid portion even higher upon an increase in the viscosity of the liquid. It can thus be seen that the reception by each detector is influenced appreciably but with opposite effect by variations in viscosity of the liquid in the vessel. An increase in viscosity will cause a greater portion of the liquid to intercept the radiation through the higher portion, thus resulting in a weaker intensity reception by detector 9. At the same time, a corresponding decrease in the intercepting liquid between the source 8 and detector 10 will effect a stronger reception by the latter detector.

The radiation responsive detectors 9 and 10 in turn produce an electrical signal which is an indication of their measurement of the intensity of received radiation. These signals pass by lead lines 11 and 12 respectively to signal adding device 13 where the sum of the incoming signals is automatically indicated. Indication may be by a meter dial, lights, noises, a recorder as referred to hereinbelow, etc.

In one embodiment of the process of this invention, variations in viscosity of a liquid in a vessel can be determined independent of concurrent variations in mass by using radiation detectors 9 and 10 which deliver electrical signals of opposite polarity as measurement of received radiation. Operation is as follows: As the amount of liquid 6 in the vessel increases, the surface level of the pool of liquid will rise, thus increasing the amount or mass of liquid between source 8 and both detectors 9 and 10, which will both then deliver weaker signals in response to the reduced intensity of received radiation. Since the signals are of opposite polarity, it will be seen that, upon summing, the addition of a weaker positive signal and a weaker negative signal will in effect cancel the respective changes in each signal, and the sum of the measurements will therefore be unchanged by an increase in the mass of the liquid. It will also be readily seen that likewise a decrease in mass of the liquid does not affect the sum of the measurements, since each detector will deliver stronger signals and a stronger positive signal will cancel a stronger negative signal.

However, although variations in mass have no net effect as just described, an increase in viscosity will result in raising the high portion of the liquid even higher and correspondingly will result in lowering the low portion of the liquid even lower. Thus, the increase in liquid between source 8 and detector 9 will effect a weaker signal from detector 9, while the reduced amount of liquid between source 8 and detector 10 will effect a stronger signal from detector 10. Since the signals are of opposite polarity, it can be seen that an increase in one and a decrease in the other will result in a marked variation in the sum of the signals. It will also be readily seen that likewise a decrease in the viscosity of the liquid will result in an opposite marked variation in the sum of the signals due to a lowering of the high portion of the liquid with a stronger signal from detector 9 and a raising of the low portion of the liquid with a weaker signal from detector 10.

In a second embodiment of the process of this invention, variations in mass of a liquid in a vessel can be determined independent of concurrent variations in viscosity by using radiation detectors 9 and 10 which deliver electrical signals of the same polarity as measurement of received radiation. Operation is as follows: As the viscosity of the liquid in the vessel increases, the high portion of the liquid will displace vertically even higher, thus increasing the amount of liquid between source 8 and detector 9 which will then deliver a weaker signal. At the same time, the low portion of the liquid will displace vertically even lower, thus decreasing the amount of liquid between source 8 and detector 10 which will then deliver a stronger signal in response to the increased intensity of transmitted radiation. Since the signals are of identical polarity, it will be seen that, upon summing, the addition of a stronger signal and a weaker signal will in effect cancel the respective changes in each signal, and the sum of the measurements will therefore be unchanged by an increase in the viscosity of the liquid. It will also be readily seen that likewise a decrease in the viscosity of the liquid does not affect the sum of the measurements, since again the addition of a weaker signal and a stronger signal will cancel the respective changes in each signal.

However, although variations in viscosity have no net effect as just described, an increase in mass will result in raising both the high and the low portions, which will increase the amount of intercepting liquid for each detector and effect a diminution of received radiation and a weaker signal from each detector. Since the signals from each are of the same polarity, it can be seen that a simultaneous decrease in each will result in a marked variation in the sum of the signals. It will also be readily seen that likewise a decrease in the mass of the liquid will result in an opposite marked variation in the sum of the signals due to a lowering of all portions of the liquid surface with a corresponding stronger signal from each detector.

Fig. 3 shows a convenient modification of the described apparatus applied in measuring with respect to liquid which more than half fills the vessel container. It is preferred that the radiation source be a single source located centrally as shown in Figures 2 and 3 since this central location permits use of a smaller source while minimizing the problem of radiation shielding outside the vessel. Of course, the radiation source as well as one or more of the detectors may be in other convenient arrangements, as illustrated in Figures 4 and 5, with one or more radiation sources 8 suitably housed, shielded and positioned outside of the vessel.

Fig. 6 shows a preferred stirring apparatus which comprises, as schematically illustrated, twin screw rotor and conveyor 14 suitably mounted on shafts 15 for rotation in opposed cooperative relationship, preferably in the directions indicated by the arrows as shown, within vessel 1 of somewhat conforming shape. In this type of apparatus, a viscous liquid being stirred will cling and adhere to some extent to the stirring means, somewhat as illustrated by the shaded portion representing liquid 6. Radiation from source 16 will be transmitted at least in part by the clinging and adhering liquid and measurement of the amount clinging will be signalled by detector 9 in response to the intensity of the received radiation. The operation of this apparatus otherwise proceeds as described above.

A preferred arrangement illustrating this invention is schematically represented in Fig. 7. Referring to Fig. 7, a single source 17 of radiation is located in a hollow in one of shafts 15, from where beams of radiation are directed to detectors 18, 19 and 20. The beams to detectors 18 and 19 pass at least in part through the high portion of the liquid and a combined signal of their measurements are delivered through lead line 21 to the summing device 23. At the same time, the signal from detector 20 is delivered through lead line 22 to the summing device 23. The sum of the incoming signals is forwarded by the summing device through lead line 24 to recorder 25, which records or otherwise charts, maps, graphs, etc., the mass or viscosity and variations thereof on any suitable medium, e.g., recording paper, film, magnetic tape, etc. It will be understood that the summing device may be merely a terminal connection between the incoming signals from lines 21 and 22 and the outgoing signal on line 24, since electrical summing will with this arrangement not require any separate summing instrument. The same is true where the added signal is used to indicate variations on a meter dial, which may be calibrated suitably.

Any high-energy radiation of submillimicron wavelength having the desired characteristics may be used in this invention. Readily available and quite suitable as sources of the desired radiation are various radioactive elements, e.g., cobalt 60 and cesium 137. In addition to normal shielding precautions for the benefit of operating personnel, caution should be exercised to avoid hazard from such material during installation and maintenance of the equipment.

Suitable detectors for the radiation may be selected from those commercially available, which include ion chambers, Geiger counters, and scintillation counters. The additive signal from the detectors may operate conventional recording apparatus, and it is desirable to eliminate the effect of random or periodic disturbances in the liquid system, as may be produced by an asymmetrical stirring or agitation means, by recording only readings integrated over an appreciable exposure time or by utilizing a recorder (or meter) with appreciable damping or other lag.

The term "liquid" as used herein in referring to the material the characteristics of which are being measured is meant to include dispersions, slurries and other liquid/solid mixtures which behave in essentially the same way upon stirring or agitation. The invention is applicable to unit operational vessels, as well as to pipes or like containers through which a liquid is moved and agitated, as by a screw pump, and closed vessels containing a given batch of liquid.

It is apparent that the present invention utilizes the limited displacing of the contents of a vessel from the level position normally assumed by a liquid under gravity alone, and for this reason the vessel should not be filled to capacity (preferably not more than about three-quarters full). The particular vessel configuration, stirring means and cooperative relationship of each may be varied as desired for particular needs in accordance with the teachings set forth herein.

In a specific application of this invention, the final polymerization step in the preparation of polymeric film-forming polyethylene terephthalate was carried out in apparatus of the type illustrated in Fig. 7 having an additional outlet at the top for the application of a partial vacuum according to known methods. A four millicurie source of cesium 137 was located inside one of the hollow shafts. Three detectors (Ohmart Corp., Model R.T. cell) were positioned as shown in Fig. 7 and electrically connected together in parallel. Their combined additive signal was delivered to a microammeter (Beckman Instruments, Inc., Model V) which drove a circular chart recording potentiometer (Leeds & Northrup Corp., 0–50 millivolt). With detectors 18, 19 and 20 each delivering a signal of the same polarity (in this case, positive), a constant record was charted of variations in mass of the liquid in the vessel independent of variations in viscosity. With detectors 18 and 19 delivering signals of polarity opposite from detector 20, a constant record was charted of variations in viscosity of the liquid in the vessel independent of variations in mass. In the preferred arrangement, the intensity of the signal delivered by detector 18 plus detector 19 approximately equalled that of detector 20. Polarity of the signals from the respective detectors was controlled by the use of either a positive or negative cell installed as detector 20, with a switch to cut either cell into the system as desired. Suitable signal amplification means may be used if required.

It will be apparent that the result of this invention may be used directly or indirectly as an operational control of a reaction or other process. Thus, measured variations in mass or viscosity may be compensated for by automatic or non-automatic adjustment of control variables, e.g., temperature, input, rotor speed, pressure, by-product removal rate, etc.

An advantage of this invention is that it makes possible easy and accurate determination of mass and viscosity of a liquid. Another advantage is that such determination can be made on a liquid within a closed system. Still another advantage is that variations in mass and viscosity are constantly observed without delay or lag as occurs in many other methods for noting such variations. A particular advantage of the apparatus of this invention is that it will not readily foul or break during use, particularly during continuous operations. Still other advantages will be apparent from the above description of the invention.

The invention claimed is:

1. Apparatus comprising a generally cylindrical vessel having its axis substantially horizontal, adapted to contain liquid; a shaft disposed within said vessel rotatable about an axis substantially parallel with the axis of said vessel; stirring means disposed on said shaft adapted to displace the liquid in said vessel vertically in part above and in part below the average surface level of the liquid; radiation means positioned to direct a beam of radiation partially absorbable by said liquid at least partially through the liquid above the average surface level and first detection means for indicating transmitted radiation of said beam, radiation means positioned to direct a beam of radiation partially absorbable by said liquid at least partially through the liquid below the average surface level and second detection means for indicating transmitted radiation of said last-mentioned beam, both detection means being capable of producing an electrical signal corresponding to the intensity of the detected radiation and being electrically connected to produce a combined signal of the additive sum of electrical signals from both of said detection means.

2. Apparatus as set forth in claim 1 wherein said first and second detection means produce electrical signals of the same polarity to provide a determination of the variations in mass of the liquid independent of variations in viscosity of the liquid.

3. Apparatus as set forth in claim 1 wherein electrical signals produced from said first and second detection means produce electrical signals of opposite polarity to provide a determination of the variations in viscosity of the liquid independent of variations in mass of the liquid.

4. Apparatus as set forth in claim 1 wherein said shaft is hollow, a single radiation source is used and said radiation source is disposed within said hollow shaft.

References Cited in the file of this patent

UNITED STATES PATENTS

| | | |
|---|---|---|
| 2,301,204 | Fields et al. | Nov. 10, 1942 |
| 2,372,595 | Maxon | Mar. 27, 1945 |
| 2,735,944 | Greer | Feb. 21, 1956 |
| 2,737,592 | Ohmart | Mar. 6, 1956 |